United States Patent [19]

Maniaci

[11] 4,068,175
[45] Jan. 10, 1978

[54] DETACHABLE COVER MEMBER FOR CAR RADIOS AND THE LIKE

[75] Inventor: Robert P. Maniaci, Downey, Calif.

[73] Assignee: Boman Industries, Downey, Calif.

[21] Appl. No.: 625,707

[22] Filed: Oct. 24, 1975

[51] Int. Cl.² .............................................. H04B 1/08
[52] U.S. Cl. ..................................... 325/352; 325/355
[58] Field of Search ............... 325/352, 353, 355, 372; 317/101 R, 101 CB, 101 DH; 179/178, 179

[56] References Cited

U.S. PATENT DOCUMENTS

| 3,195,050 | 7/1965 | Bray | 325/352 |
|---|---|---|---|
| 3,400,226 | 9/1968 | Krumreich | 179/179 |
| 3,480,743 | 11/1969 | Engh | 179/178 |
| 3,735,041 | 5/1973 | Fujita | 325/352 |
| 3,760,235 | 9/1973 | Takami | 317/101 CB |
| 3,838,229 | 9/1974 | Morrell et al. | 179/179 |
| 3,906,371 | 9/1975 | Tsuji | 325/352 |
| 3,956,701 | 5/1976 | James et al. | 325/352 |

Primary Examiner—Benedict V. Safourek
Assistant Examiner—Michael A. Masinick
Attorney, Agent, or Firm—Romney, Schaap, Golant, Scillieri, Disner & Ashen

[57] ABSTRACT

A cover for car radios and the like, having manually detachable components. A mounting frame formed by side walls is removably detachable at its rearward edge to the chassis of the radio; a front face plate is removably connected to the forward edge of the mounting frame; and, a flexible strip is removably inserted in a slot in the face plate.

6 Claims, 5 Drawing Figures

U.S. Patent            Jan. 10, 1978            4,068,175
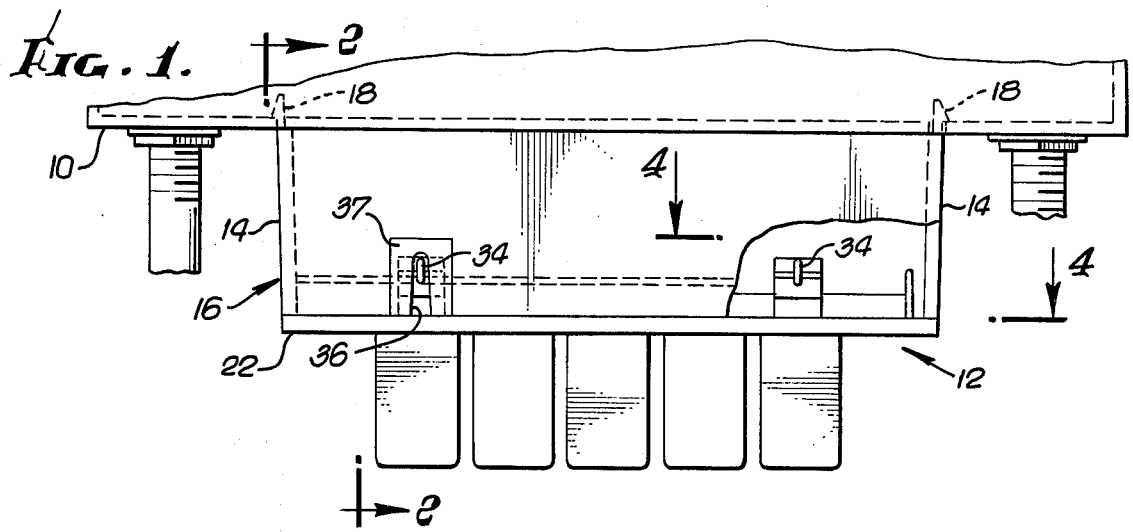
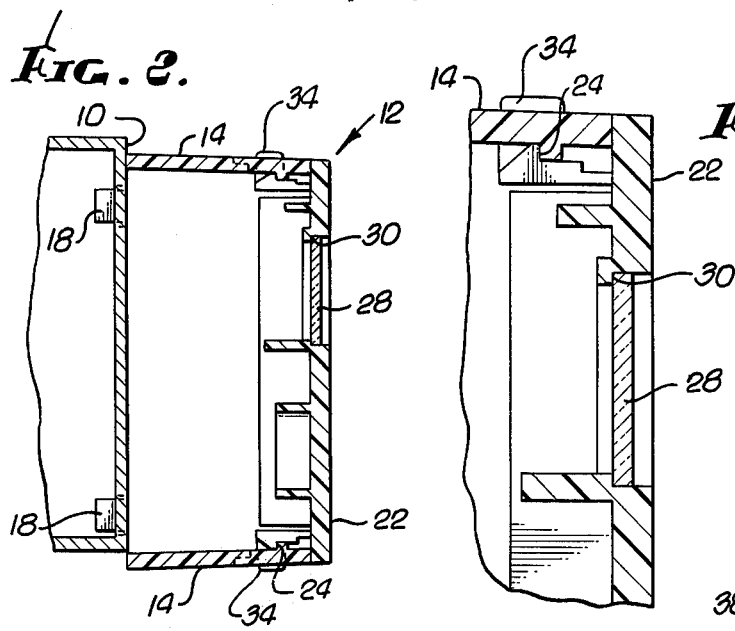
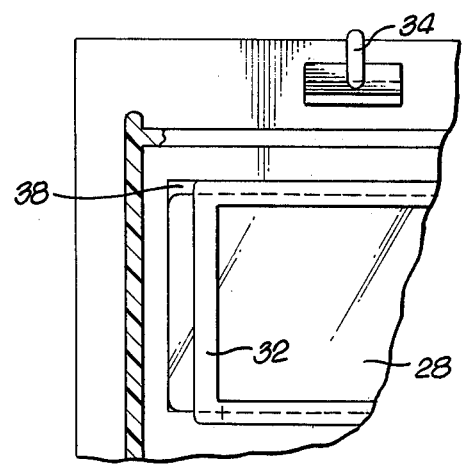
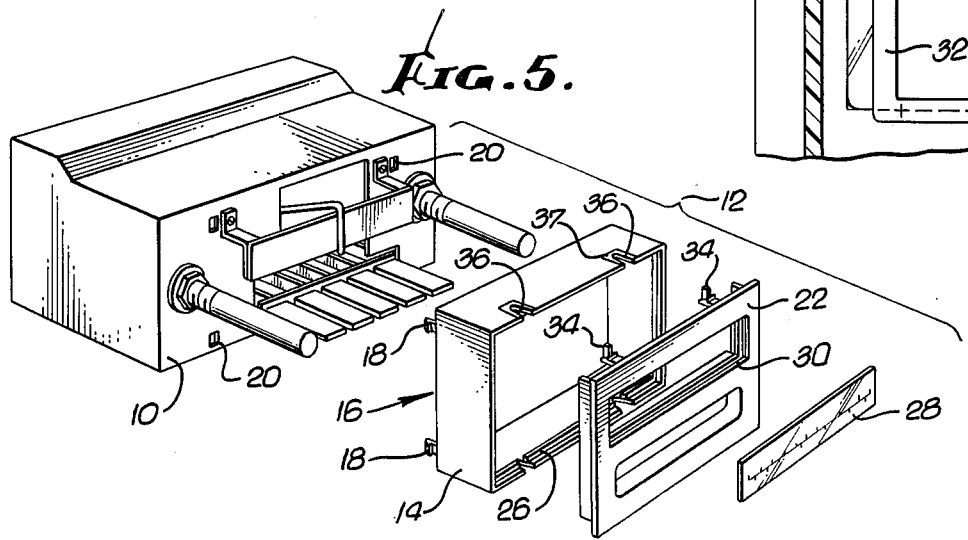

4,068,175

DETACHABLE COVER MEMBER FOR CAR RADIOS AND THE LIKE

BACKGROUND OF THE INVENTION

1. Field of the Invention

The present invention relates to detachable covers and, more particularly, to detachable covers for the operational elements of radios and the like, which may be manually removed and replaced without the need for mechanical tools.

2. Description of the Prior Art

In the past, cover plates including nose pieces, face plates and dial indication strips for radios were sold as a single composite item since all their elements were permanently fastened together.

It was also necessary to employ mechanical tools such as a screwdirver and additional fastener elements, such as screws, to affix the dover to the radio. Problems often arose with the loss of screws and washers and the frequent scratching of the face plate during installation or removal.

SUMMARY AND OBJECTS OF THE INVENTION

The above-mentioned problems of the prior art have been overcome by the present invention which provides a manually detachable cover for radios and the like, and includes manually removable components such as face plates and dial indicator strips.

A general object of the invention is to provide a detachable cover for radios, and the like, which may be installed on and removed from the front chassis plate without the need for mechanical tools and additional fastener components.

Another object of the invention is to provide a detachable cover for radios and the like which may be detached from the chassis by compressing opposite sides of the cover and installed by inserting projections of the cover into slots in the chassis.

Still another object of the invention is to provide a face plate which can be assembled and disassembled without the need for tools or other fastening means into a plurality of units, such as a mounting frame, a face plate and a flexible dial strip.

Other objects and advantages of the invention will appear from the following description taken in conjunction with the accompanying drawings of an illustrated embodiment of the invention.

BRIEF DESCRIPTION OF THE DRAWINGS

FIG. 1 is a plan view of the apparatus interconnected with the front plane of a radio chassis;

FIG. 2 is a cross-sectional view taken along line 2—2 of FIG. 1;

FIG. 3 is an enlarged view of the upper right corner of FIG. 2;

FIG. 4 is a cross-sectional view of the apparatus taken along line 4—4 of FIG. 1; and FIG. 5 is a perspective view of the disassembled apparatus.

DESCRIPTION OF THE PREFERRED EMBODIMENT

While the present invention is susceptible to various modifications and alternative constructions, and illustrative embodiment is shown in the drawings and will be described in detail hereinbelow. It should be understood, however, that it is not the intention to limit the invention to the particular form disclosed; but, on the contrary, the invention is to cover all modifications, equivalences and alternative constructions falling within the spirit and scope of the invention as expressed in the appended claims.

Referring to the drawings, there is illustrated therein a front panel 10 of a radio chassis and a detachable cover member generally designated by the numeral 12.

The detachable cover has a rectangular mounting frame 16 comprising flexible side walls 14. At the rearward portion of the mounting frame 16 there are located a rearward bracket having laterally extending lips 18 which in attached position project through holes 20 in the front panel 10 to abut the rearward surface of the front panel 10 of the radio chassis. The detachable cover is removed from the chassis by laterally compressing the vertical side walls of the mounting frame 16 so that the lips 18 disengage the rearward portion of the front plate of the chassis. The detachable cover may then be pulled forward. The cover is replaced by manually pushing it while aligning the lips 18 on the vertical side walls with the holes 20.

In the exemplary form, the detachable cover has a front plate 22 with rear brackets forming a forwardly facing latching surface 24 adjacent the periphery of the front face plate. The mounting frame 16 has a ledge 26 extending continuosly around the inward surface of the mounting frame 16. The ledge 26 is displaced from the forward edge of the mounting frame a distance approximately equal to the distance between the rearward surface of the front plate 22 and the latcing surface 24. To secure the front plate to the mounting frame, the preferred embodiment provides a pair of latching surfaces on both the top and bottom edges of the front plate which are aligned to fit within the mounting frame 16 as the two pieces are forced together until the latch engages the ledge 26. The front plate 22 is manually removable from the mounting frame 16 by directly separating the upper and lower surfaces until the ledge 26 no longer engages the latch 24, or alternatively by compressing the vertical walls of the mounting frame 16, causing the horizontal walls to bow outwardly, until the same result is achieved.

A vertical pin 34 extends outwardly from the lip 24 and engages a matching slot 36 in the mounting frame 16. The presence of the pin 16 in the slot 36 serves to restrain relative lateral movement between the front plate 22 and mounting frame 16.

In order to facilitate the separation of the front plate and the side walls, a bevel 37 adjacent the slots 36 forms an offset gripping surface along the junction between the adjacent components.

Manual disassembly is also provided by a transparent flexible strip 28 inserted in a longitudinal slot of the front plate so as to overlie a frame 30 bordering the slot. The flexible strip 28 also rests against vertical bars 32 which underlie the rearward surface of the strip, and is held at its end under overlying flap 38. To remove the strip it is only necessary to longitudinally bend the central portion forward so that the end of the strip is forced from between the bar and the flaps 38. To replace the strip, the strip is inserted between one bar 32 and the flap, the central portion then bent, and the opposite end inserted between the other bar 32 and flap.

It will therefore be appreciated by those skilled in the art that cover members, face plates and dial strips having the aforementioned characteristics can be easily replaced and/or switched by simple manual operations without tools or separate screws or other conventional fasteners.

I claim as my invention:

1. In connection with a car radio unit having operational elements on the front plate of the chasis, the improvement comprising:
   a mounting frame for certain of the operational elements, having a forward portion and a rearward portion, the rearward portion abutting the chassis plate;
   a front plate having a forward surface and a rearward surface, a portion of the rearward surface abutting the forward portion of the mounting frame;
   ledge means interior of the mounting frame and displaced from the forward portion thereof which may be flexed from a closed to an open position for removably engaging a portion of the front plate;
   latch means integral with the front plate and located on the rearward surface thereof for removalbly engaging the ledge means; and
   guide means associated with the front plate and the mounting frame for positioning the front plate relative to the mounting frame during engagement of the front plate with the mounting frame.

2. The apparatus of cliam 1, wherein the guide means comprises pin means integral with the latch means.

3. The apparatus of claim 1 wherein the guide means comprises slot means integral with the forward portion of the mounting frame for removably receiving a portion of the front plate and complementary pin means integral with the front plate for removably interconnecting with the slot means.

4. The apparatus of claim 1, wherein the latch means comprises biasing means integral with the front plate and located on the rearward surface thereof for retaining a portion of the latch means in contact with a portion of the ledge means and a portion of the interior surface of the mounting frame.

5. The apparatus of claim 3, including bevel means on the exterior of the mounting frame and in the vicinity of the slot means for forming an offset gripping surface to facilitate the removal of the front plate.

6. In a car radio unit or the like having a frame member for certain operational elements, which frame member includes flexible side walls extending forwardly from the front chassis plate, with the face plate mounted thereon, the improvement comprising:
   a slot in the forward surface of the frame member extending rearwardly for accommodating a portion of the face plate;
   a flexible strip integral with the interior surface of the frame member for removably engaging a portion of the front plate;
   a first member integral with and extending rearwardly from the rear surface of the face plate, displaced from the perimeter of the face plate and located in the vicinity of the slot when the face plate is mounted to the frame member, the first member having a latching surface extending therefrom so as to removably engage the flexible strip; and
   a pin projecting from the first member and positioned so as to be within the slot when the face plate is mounted to the frame member.

* * * * *